(12) United States Patent
Kusumoto (10) Patent No.: US 8,044,308 B2
(45) Date of Patent: Oct. 25, 2011

(54) ELECTRONIC BALANCE INCLUDING LINKING MEMBER CONNECTED BETWEEN FULCRUM AND ELECTROMAGNETIC FORCE GENERATING APPARATUS

(75) Inventor: Tetsuro Kusumoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 366 days.

(21) Appl. No.: 12/377,924

(22) PCT Filed: Jul. 5, 2007

(86) PCT No.: PCT/JP2007/063473
§ 371 (c)(1),
(2), (4) Date: Feb. 18, 2009

(87) PCT Pub. No.: WO2008/026378
PCT Pub. Date: Mar. 6, 2008

(65) Prior Publication Data
US 2010/0236841 A1   Sep. 23, 2010

(30) Foreign Application Priority Data
Aug. 29, 2006   (JP) ................................ 2006-231423

(51) Int. Cl.
*G01G 23/01* (2006.01)
*G01G 7/02* (2006.01)
(52) U.S. Cl. ............... 177/210 EM; 177/212; 73/1.13
(58) Field of Classification Search ............. 73/1.13, 73/1.15; 177/210 EM, 212
See application file for complete search history.

(56) References Cited

U.S. PATENT DOCUMENTS 4,100,985 A * 7/1978 Meier ......................... 177/189
4,153,124 A * 5/1979 Knothe et al. ......... 177/210 EM
(Continued)

FOREIGN PATENT DOCUMENTS

JP 3234213 B2 12/2001
(Continued)

*Primary Examiner* — Randy W Gibson
(74) *Attorney, Agent, or Firm* — Sughrue Mion, PLLC (57) ABSTRACT

An electronic balance is provided where precise correction can be carried out by using incorporated weight and the weight and the size can both be reduced. The electronic balance is provided with a main Roberval mechanism R1 for conveying the load of an object to be measured mounted on a scale 16, a first beam 14 to which the main Roberval mechanism R1 is connected, and at the same time, a connection means 43 is connected, a second beam 42 to which the first beam 14 is connected via the connection means 43, and at the same time, an electromagnetic force generating apparatus 17 for generating an electromagnetic force which is balanced with the load of the object to be measured that is conveyed from the first beam 14 is connected, incorporated weight 18 for correction, a sub-Roberval mechanism R2 for conveying the load of the incorporated weight in the vertical direction, and a linking member 44 for conveying the load of the incorporated weight to the second beam 42 via the sub-Roberval mechanism R2, and characterized in that the linking member 44 is connected the second beam 42 on the electromagnetic force generating apparatus 17 side relative to the second fulcrum 41.

6 Claims, 8 Drawing Sheets

U.S. PATENT DOCUMENTS

| | | | |
|---|---|---|---|
| 4,343,373 A * | 8/1982 | Stadler et al. | 177/50 |
| 4,354,563 A * | 10/1982 | Luchinger et al. | 177/212 |
| 4,932,487 A * | 6/1990 | Melcher et al. | 177/50 |
| 5,866,854 A * | 2/1999 | Emery et al. | 177/50 |
| 6,365,847 B1 | 4/2002 | Müller et al. | |
| 6,861,593 B2 * | 3/2005 | Kuhlmann et al. | 177/210 EM |
| 7,395,689 B2 * | 7/2008 | Genoud et al. | 73/1.13 |
| 7,513,139 B2 * | 4/2009 | Genoud et al. | 73/1.13 |
| 2007/0193788 A1 * | 8/2007 | Walter et al. | 177/212 |
| 2008/0053249 A1 * | 3/2008 | Reber et al. | 73/862.69 |

FOREIGN PATENT DOCUMENTS

| | | |
|---|---|---|
| JP | 3422902 B2 | 7/2003 |
| JP | 3645372 B2 | 5/2005 |

* cited by examiner

ELECTRONIC BALANCE INCLUDING LINKING MEMBER CONNECTED BETWEEN FULCRUM AND ELECTROMAGNETIC FORCE GENERATING APPARATUS

TECHNICAL FIELD

The present invention relates to an electronic balance, and in particular, to an electronic balance which is formed so that precise correction can be carried out with an incorporated weight.

BACKGROUND ART

Analytical balances with which an extremely light object of approximately 1 µg can be measured have been proposed as electronic balances, and large scale balances with which an extremely heavy object of several tens of kg can be measured have also been proposed. In these electronic balances, a change in the temperature, for example, causes a change in the electromagnetic force, which is scaled with the load of the object to be weighed, or a slight expansion or contraction of the load conveying mechanism. As a result, there is an error in the results of the measurement of the load of the object to be weighed. Therefore, it is necessary to correct the electronic balance using weight for correction in order to prevent errors from being caused in the results of measurement of the load of the object to be weighed.

Thus, in the case where correction is carried out using weight for correction, it is necessary to pay attention to the handling and maintenance of the weight for correction, and therefore, there are weight incorporated type electronic balances where weight for correction has been installed in advance within an electronic balance. In these weight incorporated type electronic balances, appropriate correction is carried out through the operation of the buttons by the operator, or automatic correction is carried out through signals from a timer, a temperature sensor and the like.

Figure 5:
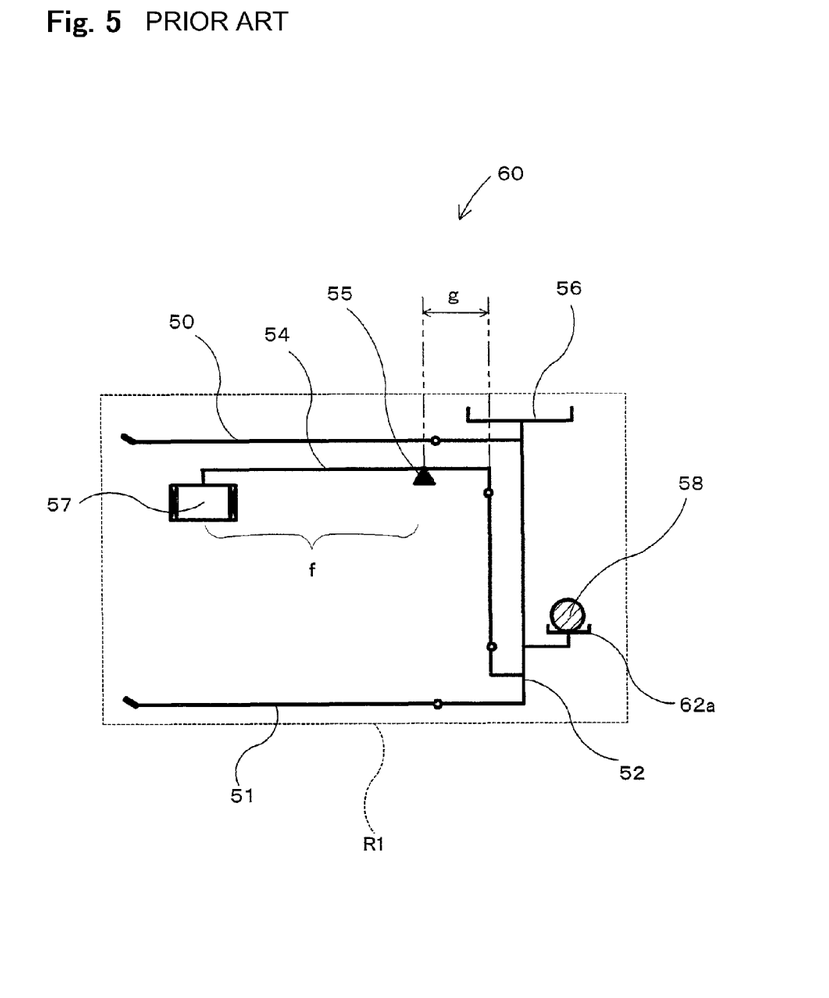
FIG. 5 is a diagram schematically showing the configuration of a conventional incorporated weight type electronic balance.

FIG. 5 is a diagram schematically showing the configuration of a conventional weight incorporated type electronic balance. In an electronic balance 60, an upper beam 50, a lower bean 51 and a movable portion 52 for connecting the upper beam 50 and the lower beam 51 form a main Roberval mechanism R1 for conveying the load of the object to be weighed W which is applied to a scale 56 in the vertical direction, and a beam 54 which is connected to the movable portion 52 of the main Roberval mechanism R1 is provided so as to be able to sway with a fulcrum 55 at the center. Furthermore, an electromagnetic force generating apparatus 57 is provided to the beam 54 on the side opposite to the movable portion 52 side. As a result, the load of the object to be weighed W which is applied to the scale 56 is conveyed to the beam 54 via the main Roberval mechanism R1, and thus, an electromagnetic force required to keep the beam 54 balanced is generated in the electromagnetic force generating apparatus 57. Accordingly, the current value which is required to generate the electromagnetic force at this time is measured so that the load of the object to be weighed W can be measured as the amount of electricity. At this time, the ratio of the length (g) of the beam 54 on the movable portion 52 side to the length (f) of the beam 54 on the electromagnetic force generating apparatus 57 side with the fulcrum 55 of the beam 54 as a reference becomes the leverage.

In this electronic balance 60, correction is carried out using incorporated weight 58, and therefore, an engaging portion 62a is provided in the movable portion 52 and the load of the incorporated weight 58 can be conveyed to the engaging portion 62a in the configuration.

Figure 6:
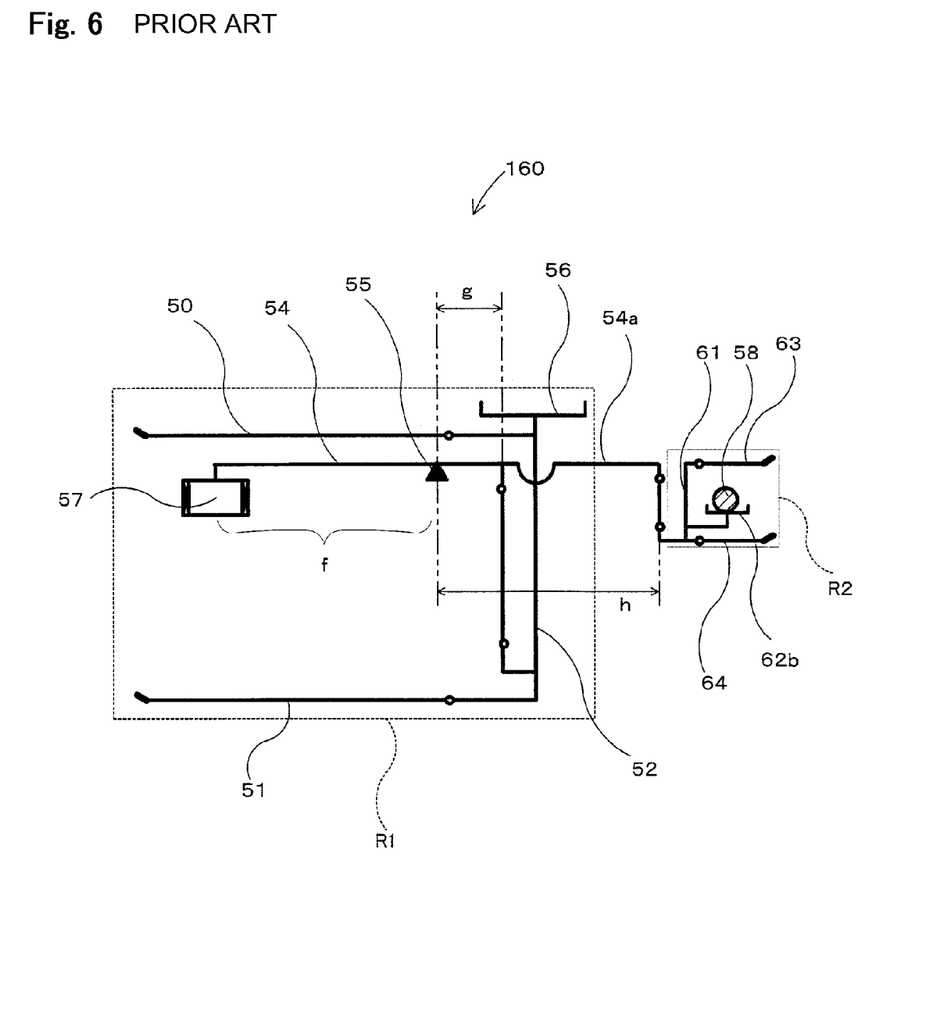
FIG. 6 is a diagram schematically showing the configuration of another conventional incorporated weight type electronic balance.

FIG. 6 shows an example of a conventional electronic balance where the size of incorporated weight is reduced, and in the electronic balance 160, correction is carried out using light incorporated weight 58, and therefore, an extension portion 54a which extends from the movable portion 52 side of the beam 54 is provided, and at the same time, the movable portion 61 of a sub-Roberval mechanism R2 is connected to the extension portion 54a. Here, the same symbols are attached to the same components as in the above described electronic balance 60, and the descriptions thereof are omitted.

An upper beam 63 and a lower beam 64 are connected to the top and the bottom of the movable portion 61, and thus, the sub-Roberval mechanism R2 is formed. In addition, an engaging portion 62b on which incorporated weight 58 is placed is provided in the movable portion 61. At this time, the ratio (h:f) of the length (h) of the beam 54 on the movable portion 61 side and the length (f) of the beam 54 on the electromagnetic force generating apparatus 57 side with the fulcrum 55 of the beam 54 as a reference becomes the leverage. Accordingly, the point where the movable portion 61 to which the load of the incorporated weight 58 is applied and the beam 54 are connected is moved away from the fulcrum 55 of the beam 54, that is to say, the length (h) of the beam 54 on the movable portion 61 side is increased, and thus, correction can be carried out with a relatively light incorporated weight 58.

Here, in order to carry out precise correction, it is desirable for the electromagnetic force to be generated in the electromagnetic force generating apparatus 57 so that the object to be weighed W is in a state which is actually measured using incorporated weight 58. However, in large scale balances with which an extremely heavy object to be weighed W of several tens of kg is measured, in the case where incorporated weight 58, which is sufficient for the object to be weighed W, is contained, it increases the weight of the electronic balance 60 or 160, while in the case where the length (h) of the beam 54 on the movable portion 61 side is increased in order to use the relatively light incorporated weight 58, various problems arise such that the volume of the electronic balance 160 increases.

Figure 7:
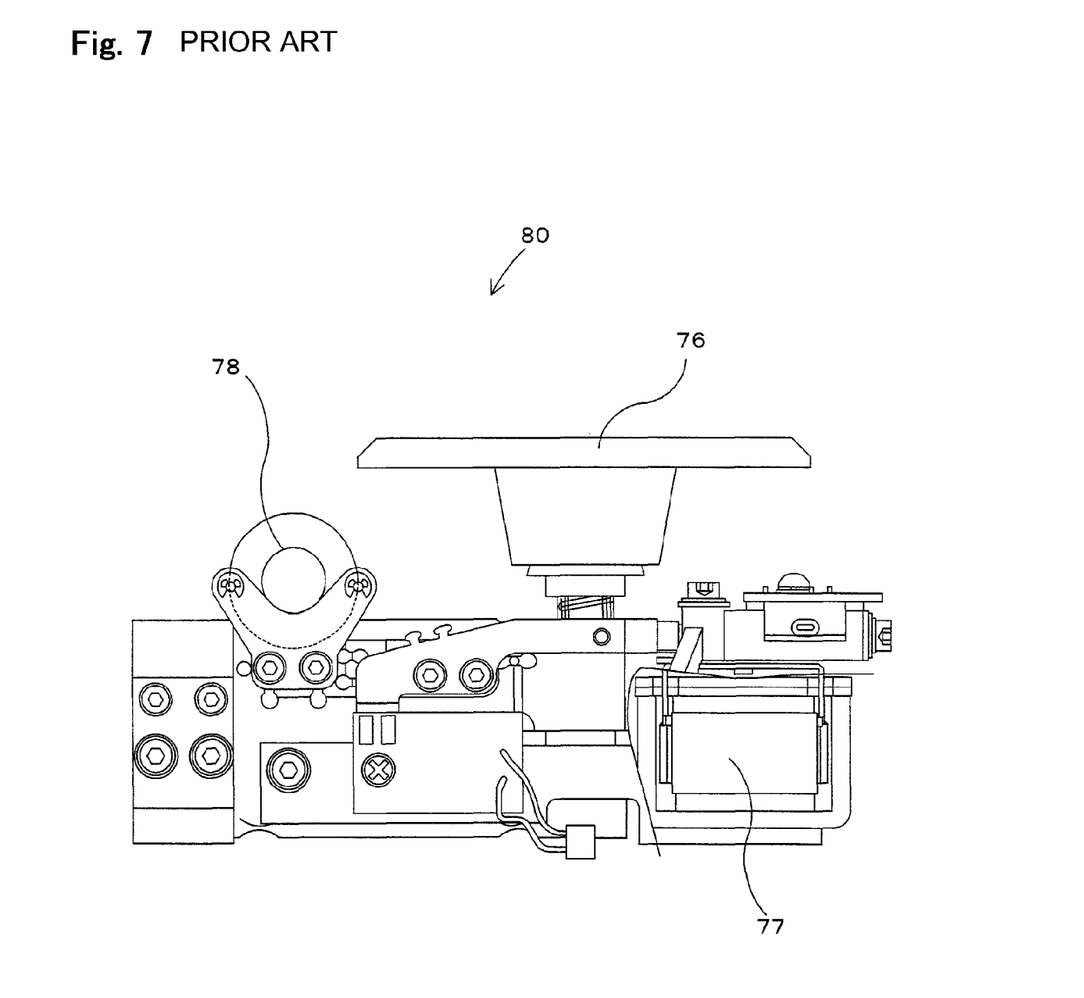
FIG. 7 is a side diagram showing another conventional incorporated weight type electronic balance.
Figure 8:
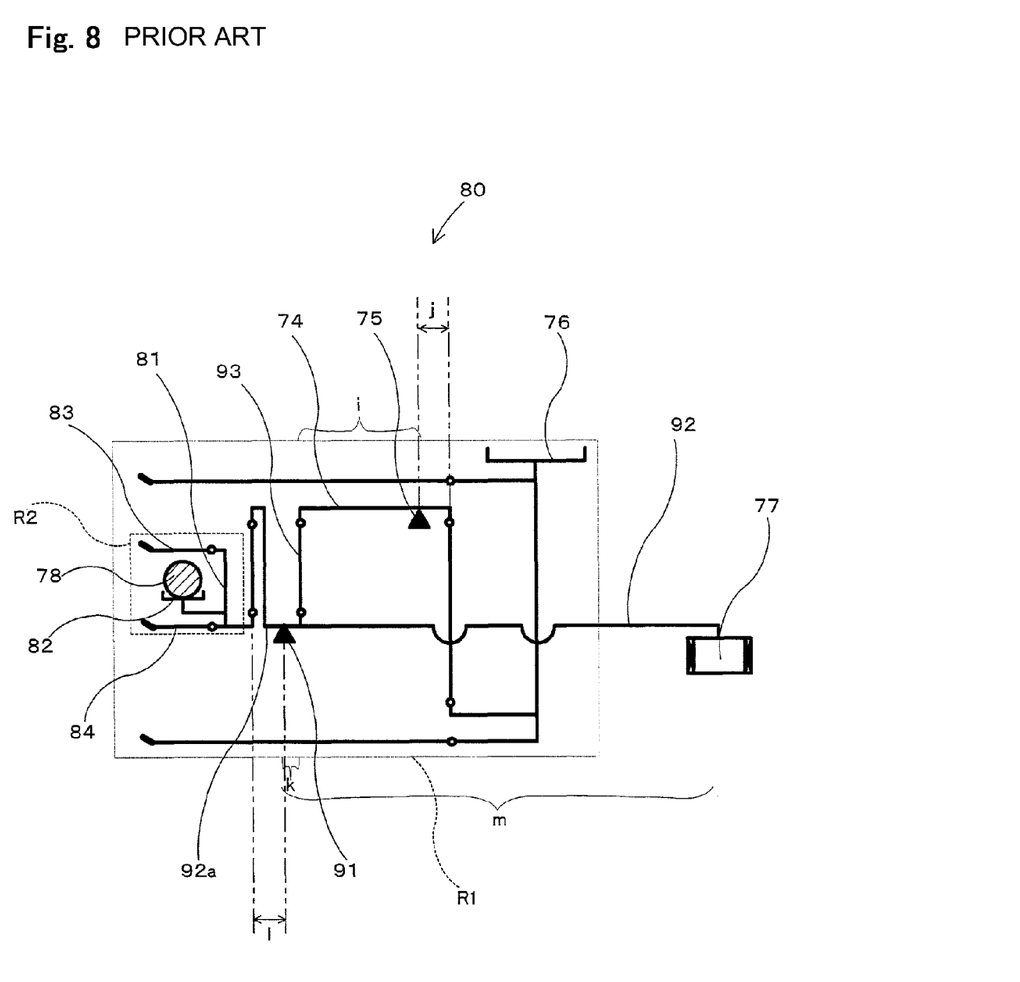
FIG. 8 is a diagram schematically showing the configuration of the electronic balance shown in FIG. 7.

Thus, incorporated weight type electronic balances having first and second beams are disclosed. FIG. 7 is a side diagram showing another conventional weight incorporated type electronic balance, and FIG. 8 is a diagram schematically showing the configuration of the electronic balance shown in FIG. 7. The electronic balance 80 is provided with a main Roberval mechanism R1 for conveying the load of the object to be weighed W which is applied to a scale 76 in the vertical direction, a first beam 74, which is formed so as to be able to sway by means of a fulcrum 75 and of which one end is connected to a movable portion of the main Roberval mechanism R1 and of which the other end is connected to a second beam 92 via a connection member 93, an electromagnetic force generating apparatus 77, incorporated weight 78 for correction, a sub-Roberval mechanism R2 for conveying the load of the incorporated weight 78 in the vertical direction and a second beam 92 of which one end is connected to a movable portion 81 of the sub-Roberval mechanism R2 and of which the other end is connected to the electromagnetic force generating apparatus 77. As a result, the ratio (j:i) of the length (j) of the first beam 74 on the movable portion side to the length (i) of the first beam 74 on the connection member 93 side with a fulcrum 75 of the first beam 74 as a reference becomes the leverage, and at the same time, the ratio (k:m) of the point (k) at which the connection member 93 and the second beam 92 are connected to the length (m) of the second beam 92 on the electromagnetic force generating apparatus 77 side with a fulcrum 91 of the second beam 92 as a reference becomes the leverage.

In this electronic balance 80 also, correction is carried out using incorporated weight 78, and therefore, an extension portion 92a which extends from the second beam 92 on the side opposite to the electromagnetic force generating apparatus 77 side is provided, and at the same time, a movable portion 81 of the sub-Roberval mechanism R2 is connected to the extension section 92a. Here, an upper beam 83 and a lower beam 84 are connected to the top and the bottom of the movable portion 81, and thus, a sub-Roberval mechanism R2 for conveying the load of the incorporated weight 78 in the vertical direction is formed. At this time, the ratio (l:m) of the length (l) of the second beam 92 on the movable portion 81 side to the length (m) of the second beam 92 on the electromagnetic force generating apparatus 77 side with a fulcrum 91 of the second beam 92 as a reference becomes the leverage. Accordingly, the point where the movable portion 81 to which the load of the incorporated weight 78 is applied and the second beam 92 are connected is moved away from the fulcrum 91 of the second beam 92, that is to say, the length (l) of the second beam 92 on the movable portion 81 side is increased so that correction can be carried out with a relatively light incorporated weight 78.

DISCLOSURE OF THE INVENTION

Problem to be Solved by the Invention

The further the point where the movable portion 61 or 81 to which the load of the incorporated weight 58 or 78 is applied and the beam 54 or the second beam 92 are connected is away from the fulcrum 55 or 91 of the beam 54 or the second beam 92, the lighter the incorporated weight 58 or 78 is in order to carry out correction, while the longer the length of the beam 54 or the second beam 92 becomes. Meanwhile, the shorter the length of the beam 54 or the second beam 92 is, the closer the point where the movable portion 61 or 81 to which the load of the incorporated weight 58 or 78 is applied and the beam 54 or the second beam 92 are connected becomes to the fulcrum 55 or 91 of the beam 54 or the second beam 92, and therefore, the weight of the incorporated weight 58 or 78 must increase. That is to say, a reduction in the weight and the size of the electronic balance cannot both be achieved.

Thus, an object of the present invention is to provide an electronic balance where precise correction can be carried out by using incorporated weight and the weight and the size can both be reduced.

Means for Solving Problem

In order to solve the above described problem, the electronic balance according to the present invention is provided with: a scale; a main Roberval mechanism for conveying the load of an object to be measured which is mounted on the scale in the vertical direction; a first beam made up of a first pole which is supported by a first fulcrum so as to be able to sway, where the main Roberval mechanism is connected to the near distance point and a connection means for conveying the load of the object to be measured is connected to the far distance point, the near distance point being a distance point close to the first fulcrum on the first pole and the far distance point being a distance point far away from the first fulcrum; a second beam made up of a second pole which is supported by a second fulcrum so as to be able to sway, where the first beam is connected to a near distance point via a connection means and an electromagnetic force generating apparatus for generating an electromagnetic force that is balanced with the load of the object to be measured which is conveyed from the first beam is connected to a far distance point, the near distance point being a distance point close to the second fulcrum on the second pole and the far distance point being a distance point far away from the second fulcrum; incorporated weight for correction; a sub-Roberval mechanism for conveying the load of the above described incorporated weight in the vertical direction; a linking member for conveying the load of the above described incorporated weight to the second beam via the above described sub-Roberval mechanism; and an electromagnetic force generating apparatus for generating an electromagnetic force that is balanced with the load of the object to be measured, and the above described linking member is connected to the above described second beam on the electromagnetic force generating apparatus side relative to the second fulcrum.

Here, "connection means" links the first beam to the second beam and conveys the load of the object to be measured that is conveyed from the scale through the first beam (here, the size of the load attenuates in accordance with the leverage of the first beam) to the second beam, and concretely, may be formed of only one connection member which can convey the load of the object to be measured at the far distance point in the first beam as it is, or may make the load of the object to be measured at the far distance point in the first beam attenuate by intervening a more mechanical load conveying mechanism (for example, middle beams) and then convey the load of the object to be measured to the second beam.

Effects of the Invention

In the electronic balance according to the present invention, the linking member for conveying the load of the incorporated weight is connected between the second fulcrum of the second beam and the electromagnetic force generating apparatus, and therefore, the incorporated weight can be provided without an extending portion being provided where the first beam is extended. In addition, correction can be carried out with a small and lightweight incorporated weight. That is to say, a reduction in the weight and a miniaturization of the electronic balance can both be achieved.

Other Means for Solving Problem and Effects

In the above invention, the connection means may include at least one middle beam made up of a pole of which the two ends are connected to the first beam and the second beam via connection members in series, each middle beam is supported by a middle fulcrum in the middle beam so as to be able to sway, and a near distance point of each middle beam is connected to the connection member on the first beam side and a far distance point of each middle beam is connected to the connection member on the second beam side, the near distance point being a distance point close to the middle fulcrum of the middle beam and the far distance point being a distance point far away from the middle fulcrum.

As a result, the load of the object to be measured which is conveyed from the first beam is reduced before being conveyed to the second beam in accordance with the lever ratio of the middle beam provided between the first beam and the second beam (in the case where a number of middle beams are connected in series, the product of the lever ratios), and therefore, the incorporated weight for correction can be further reduced.

In addition, in the above respective inventions, the load of the above described incorporated weight may be conveyed to the above described sub-Roberval mechanism when the load of the above described object to be measured is weighed, and at the same time, the load of the above described incorporated weight need not to be conveyed to the above described sub-Roberval mechanism at the time of correction.

As a result, in the case of a structure where the direction of the force when the load of the object to be scaled mounted on the scale is conveyed to the electromagnetic force generating apparatus and the direction in which the force is conveyed to the electromagnetic force generating apparatus by the load when the incorporated weight is mounted on the sub-Roberval mechanism (that is to say, increased load on the sub-Roberval mechanism) are in opposite directions, the load is removed from the sub-Roberval mechanism (that is to say, the load applied to the sub-Roberval mechanism in advance is reduced) at the time of correction, and thus, the direction of the force can be made the same so that the force can be conveyed to the electromagnetic force generating apparatus. Therefore, compared to the case where the direction of the force becomes a different direction when the force is conveyed to the electromagnetic force generating apparatus, the width of the intensity of the electromagnetic force which is required to maintain the balance of the second beam in the electromagnetic force generating apparatus can be narrowed in the configuration.

EXPLANATION OF SYMBOLS 1, 2, 101 electronic balance
14 first beam
15 first fulcrum
41 second fulcrum
17 electromagnetic force generating apparatus
18 incorporated weight
42 second beam
43 connection member
44 linking member
46 middle beam
47 middle fulcrum
48 connection member

BEST MODE FOR CARRYING OUT THE INVENTION

In the following, the embodiments of the present invention are described in reference to the drawings. Here, the present invention is not limited to the below described embodiments, and, of course, includes various embodiments in a range without deviating from the gist of the present invention.

First Embodiment

Figure 1:
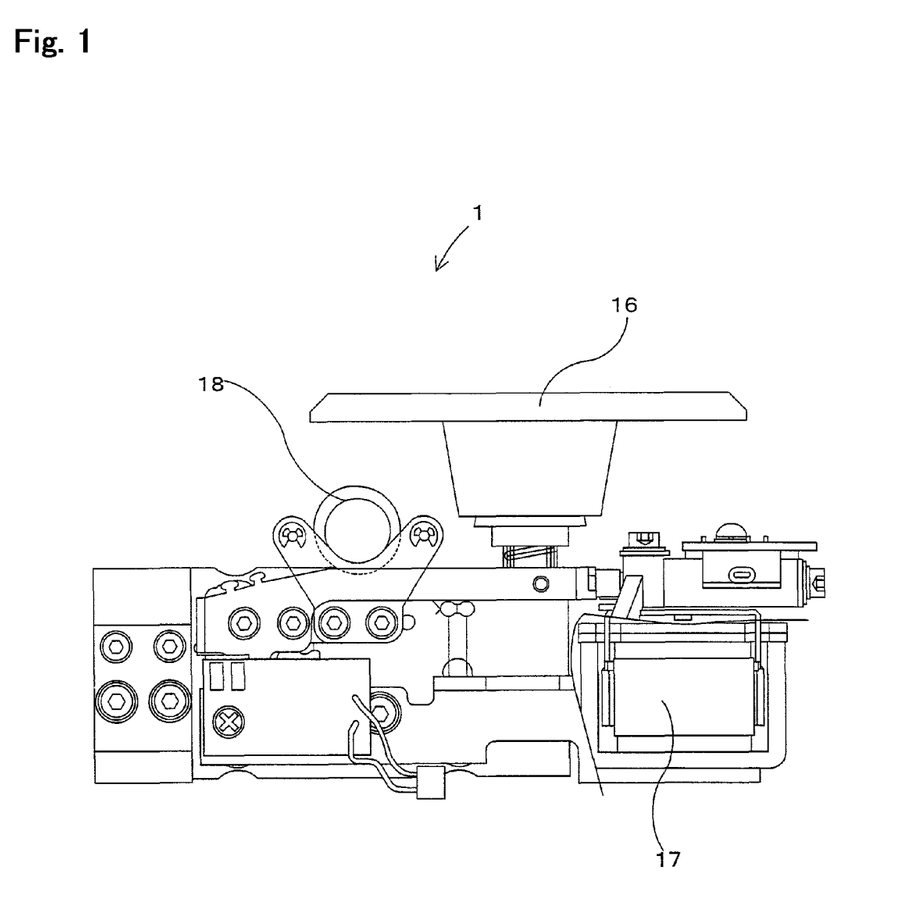
FIG. 1 is a side diagram showing the electronic balance according to one embodiment of the present invention.
Figure 2:
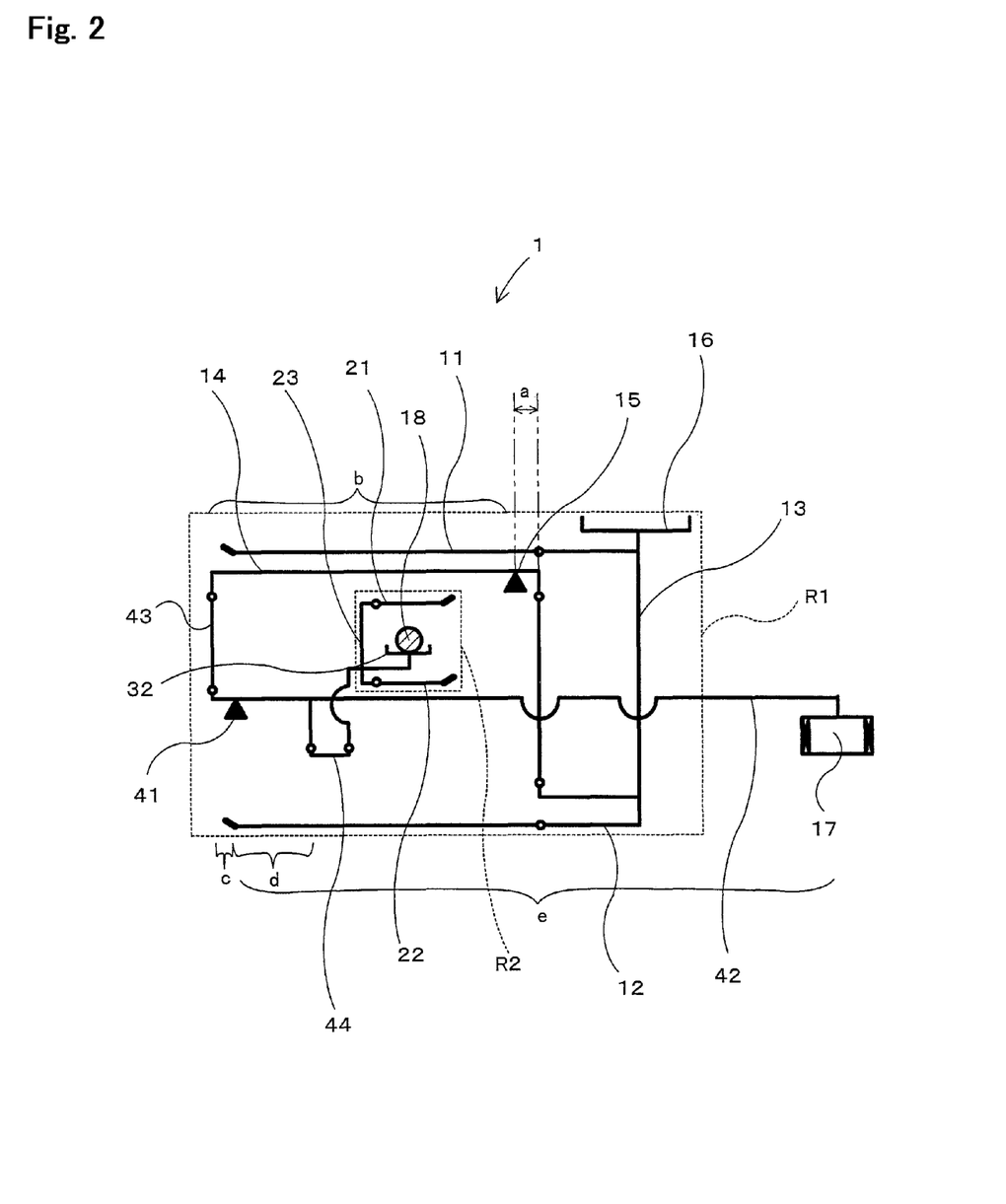
FIG. 2 is a diagram schematically showing the configuration of the electronic balance shown in FIG. 1.

FIG. 1 is a side diagram showing the electronic balance according to one embodiment of the present invention, and FIG. 2 is a diagram schematically showing the configuration of the electronic balance shown in FIG. 1. In the present embodiment, the connection mechanism is formed of only a connection member for linking the first beam and the second beam.

An electronic balance 1 is provided with: a first beam 14 which is formed of a main Roberval mechanism R1 for conveying the load of the object to be scaled W in the vertical direction and a first pole which is supported by a first fulcrum 15 so as to be able to sway, and where the main Roberval mechanism R1 is connected to one end portion on the side close to the first fulcrum of the first pole (near distance point) and a second beam (beam at the final stage) 42 is connected to the other end portion on the side far away from the first fulcrum (far distance point) via the connection member 43; a second beam 42 which is formed of a second pole supported by the second fulcrum 41 so as to be able to sway, and where the first beam 14 is connected to one end portion on the side close to the second fulcrum 41 of the second pole (near distance point) via the connection member 43 as described above, and the electromagnetic force generating apparatus 17 is connected to the other end portion on the side far away from the second fulcrum 41 (far distance point); an electromagnetic force generating apparatus 17 for generating electromagnetic force which is balanced with the upright load; incorporated weight 18 for correction; a sub-Roberval mechanism R2 for conveying the load of the incorporated weight 18 in the vertical direction; and a linking member 44 where the sub-Roberval mechanism R2 is connected to one end portion and the second beam 42 is connected to the other end portion.

The main Roberval mechanism R1 conveys the load of the object to be scaled W in the vertical direction and has an upper beam 11, a lower beam 12 and a movable portion 13 for linking the upper beam 11 and the lower beam 12. Furthermore, a scale 16 on which the object to be scaled W is placed is provided in an upper portion of the movable portion 13.

The first beam 14 is formed of a pole which is able to sway with the first fulcrum 15 at the center. In addition, the movable portion 13 in the main Roberval mechanism R1 is connected to one end portion (near distance point) of the first beam 14, and at the same time, the second beam is connected to the other end portion (far distance point) of the first beam 14 via the connection member 43. Therefore, the load of the object to be scaled W placed on the scale 16 is conveyed to the first beam 14 via the main Roberval mechanism R1, and thus, the displacement of the first beam 14 is conveyed to the second beam 42 via the connection member 43. At this time, the ratio (a:b) of the length (a) of the first beam 14 on the movable portion 13 side to the length (b) of the first beam 14 on the connection member 43 side with the first fulcrum 15 of the first beam 14 as a reference is a lever ratio.

The second beam 42 is provided so as to be able to sway with the second fulcrum 41 at the center. In addition, the first beam 14 is connected to one end portion of the second beam 42 (near distance point) via the connection member 43, and at the same time, the electromagnetic force generating apparatus 17 is provided to the other end portion of the second beam 42 (far distance point). Therefore, the displacement of the first beam 14 is conveyed to the second beam 42 via the connection member 43, and thus, the second beam 42 is displaced. Here, the first beam 14 is connected to the second beam 42 on the side opposite to the electromagnetic force generating apparatus 17 side relative to the second fulcrum 41. As a result, the load of the object to be scaled W placed on the scale 16 is conveyed for the downward displacement on the electromagnetic force generating apparatus 17 side of the second beam 42 relative to the second fulcrum 41. That is to say, the direction in which the load of the object to be scaled W placed on the scale 16 is conveyed to the electromagnetic force generating apparatus 17 and the direction in which the load of the below described incorporated weight 18 is conveyed to the electromagnetic force generating apparatus 17 can be made the same when the load is conveyed to the electromagnetic force generating apparatus 17. Therefore, as for the electromagnetic force required to maintain the balance of the second beam 42 in the electromagnetic force generating apparatus 17, only the electromagnetic force in the direction toward one side needs to be taken into consideration, and thus, the width of the intensity of the electromagnetic force can be narrowed.

Here, the ratio (c:e) of the length (c) of the second beam 42 on the connection member 43 side to the length (e) of the second beam 42 on the electromagnetic force generating apparatus 17 side with the second fulcrum 41 of the second beam 42 as a reference is a lever ratio.

The electromagnetic force generating apparatus 17 generates electromagnetic force which is balance with the applied load. An example is a force coil provided in a static magnetic field created by a magnetic circuit so as to be movable, and thus, electromagnetic force for balancing the second beam 42 can be generated by making a current flow through the force coil. Therefore, the load of the object to be scaled W can be measured as an electrical amount by measuring the current value required to balance the second beam.

The sub-Roberval mechanism R2 conveys the load of the incorporated weight 18 in the vertical direction and has an upper beam 21, a lower beam 22 and a movable portion 23 for linking the upper beam and the lower beam 22. Furthermore, the movable portion 23 is provided with an engaging portion 32 for carrying the incorporated weight 18. Here, the incorporated weight 18 is supported by a hoisting apparatus (not shown) at the time of conventional weighing, and thus, the load of the incorporated weight 18 is prevented from being applied to the engaging portion 32. Meanwhile, the incorporated weight 18 is not supported by the hoisting apparatus (not shown) at the time of correction, and thus, the load of the incorporated weight 18 is applied to the engaging portion 32.

The movable portion 23 of the sub-Roberval mechanism R2 is connected to one end portion of the linking member 44, and at the same time, the second beam 42 is connected to the other end portion of the linking member 44. Therefore, the load of the incorporated weight 18 is conveyed to the second beam 42 via the sub-Roberval mechanism R2. At this time, the linking member 44 is connected to the second beam 42 on the electromagnetic force generating apparatus 17 side of the second fulcrum 41. That is to say, the ratio (d:e) of the point (d) where the second beam 42 and the linking member 44 are connected to the length (e) of the second beam 42 on the electromagnetic force generating apparatus 17 side with the second fulcrum 41 of the second beam 42 as a reference is a lever ratio.

As described above, in the electronic balance 1, the linking member 44 for conveying the load of the incorporated weight 18 is connected between the second fulcrum 41 and the electromagnetic force generating apparatus 17, and therefore, the incorporated weight 18 can be provided without an extending portion, which is an extension of the first beam 14 on the movable portion 13 side, being provided. In addition, precise correction can be carried out using the incorporated weight 18 which has a load as light as W×(a/b)×(c/d). That is to say, a reduction in weight and in size of the electronic balance 1 can both be achieved.

Second Embodiment

Figure 3:
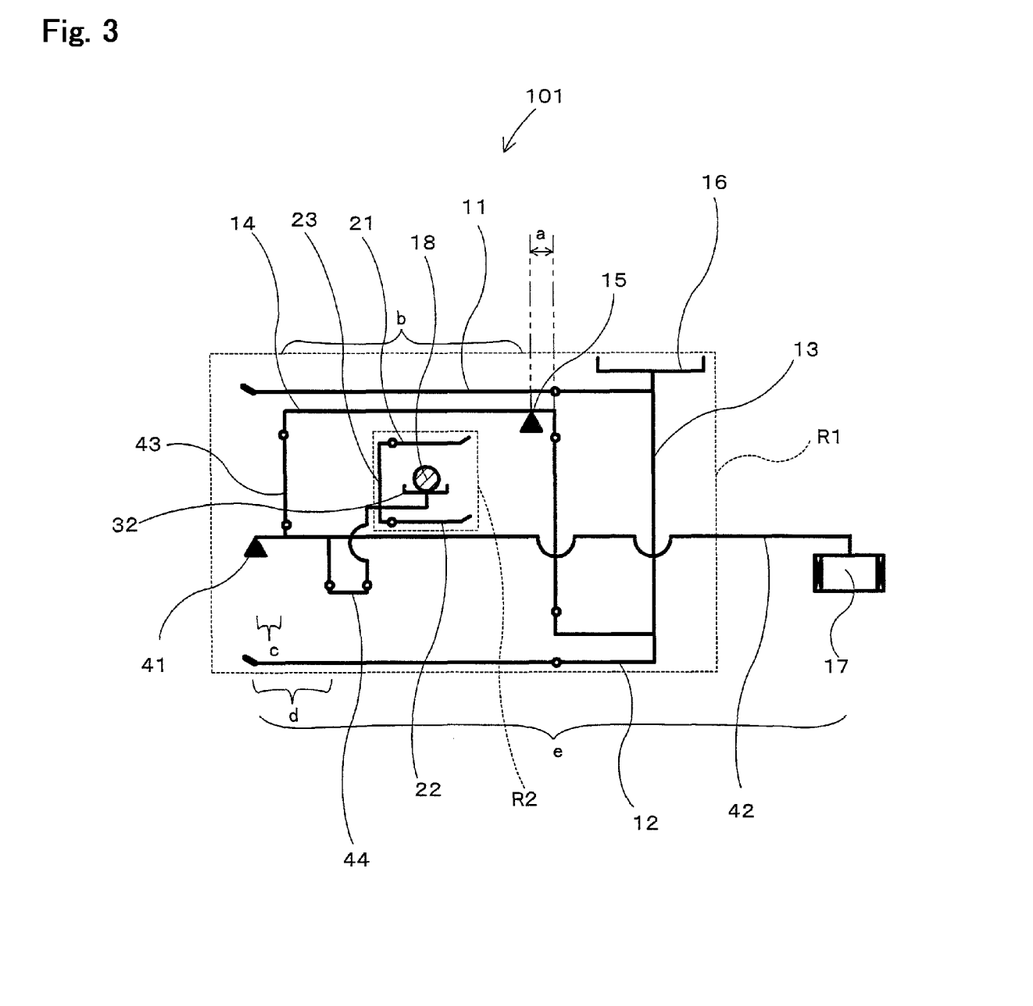
FIG. 3 is a diagram schematically showing the configuration of the electronic balance according to another embodiment of the present invention.

FIG. 3 is a diagram schematically showing the configuration of the electronic balance according to another embodiment of the present invention. The present embodiment is different from the above described first embodiment and has a configuration where the load of the incorporated weight is conveyed to the sub-Roberval mechanism when the load of the object to be measured is scaled, and at the same time, the load of the incorporated weight is not conveyed to the sub-Roberval mechanism at the time of correction. Here, the same symbols are attached to the same components as in the above described first embodiment, and the descriptions are not repeated.

The electronic balance 101 is provided with: a main Roberval mechanism R1 for conveying the load of an object to be scaled W in the vertical direction; a first beam 14 which is formed of a first pole supported by the first fulcrum 15 so as to be able to sway and where the main Roberval mechanism R1 is connected to one end portion of the first pole on the side close to the first fulcrum 15 (near distance point), and at the same time, the second beam 42 is connected to the other end portion on the side far away from the first fulcrum 15 (far distance point) via the connection member 43; a second beam 42 which is formed of a second pole supported by the second fulcrum 41 so as to be able to sway and where the first beam 14 is connected to one point on the side close to the second fulcrum 41 (near distance point) via the connection member 43 as described above, and at the same time, the electromagnetic force generating apparatus 17 is connected to one point on the side far away from the second fulcrum 41 (far distance point); an electromagnetic force generating apparatus 17 for generating electromagnetic force which is balanced with the applied load; incorporated weight 18 for correction; a sub-Roberval mechanism R2 for conveying the load of the incorporated weight 18 in the vertical direction; and a linking member 44 where the sub-Roberval mechanism R2 is connected to one end portion, and at the same time, the second beam 42 is connected to the other end portion.

The second beam 42 is provided so as to be able to sway with the second fulcrum 41 located in an end portion at the center. In addition, the first beam 14 is connected to the second beam 42 via the connection member 43, and at the same time, an electromagnetic force generating apparatus 17 is provided in the other end portion of the second beam 42. At this time, unlike the above described first embodiment, the first beam 14 is connected to the second beam 42 on the electromagnetic force generating apparatus 17 side of the second fulcrum 41.

The sub-Roberval mechanism R2 conveys the load of the incorporated weigh 18 in the vertical direction and has an upper beam 21, a lower beam 22 and a movable portion 23 for linking the upper beam 21 and the lower beam 22. Here, unlike the above described first embodiment, the incorporated weight 18 is supported by a hoisting apparatus (not shown) at the time of correction, and thus, the load of the incorporated weight 18 is not applied to the engaging portion 32. Meanwhile, at the time of conventional weighing, the incorporated weight 18 is not supported by the hoisting apparatus (not shown), and thus, the load of the incorporated weight 18 is applied to the engaging portion 32. That is to say, the direction in which the load of the object to be scaled W placed on the scale 16 is conveyed to the electromagnetic force generating apparatus 17 and the direction in which the load of the incorporated weight 18 is not conveyed to the electromagnetic force generating apparatus 17 can be made the same when the load is conveyed to the electromagnetic force generating apparatus 17. Therefore, in comparison with the case where the load is conveyed to the electromagnetic force generating apparatus so that the directions of force become opposite, the width of the intensity of the electromagnetic force which is required to maintain the balance of the second beam 42 in the electromagnetic force generating apparatus 17 can be narrowed.

As described above, in the electronic balance 101, the linking member 44 for conveying the load of the incorporated weight 18 is connected between the second fulcrum 41 and the electromagnetic force generating apparatus 17, and therefore, the incorporated weight 18 can be provided without an extending portion, which is the extension of the first beam 14 on the movable portion 13 side, being provided. In addition, precise correction can be carried out using the incorporated weight 18 having a load as light as W×(a/b)×(c/d). That is to say, a reduction in the weight and in the scale of the electronic balance 101 can both be achieved.

Third Embodiment

Figure 4:
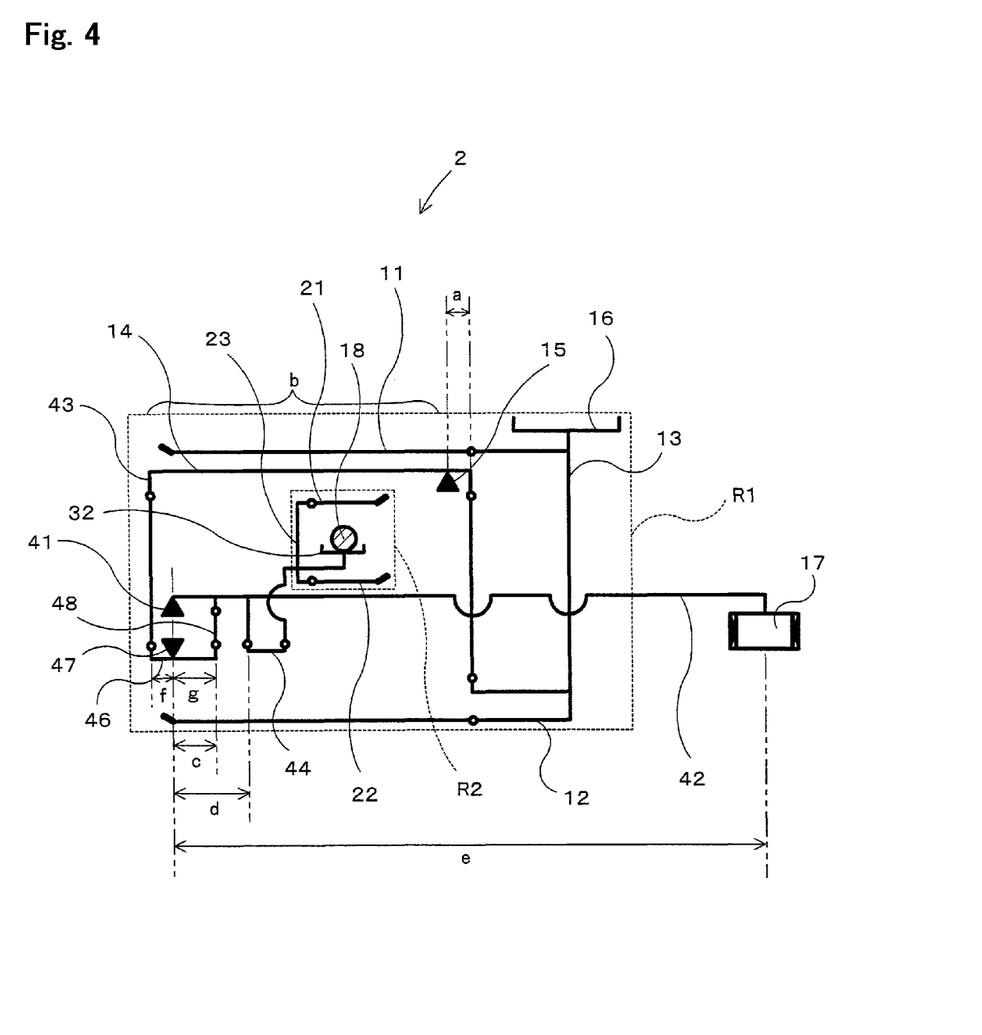
FIG. 4 is a diagram schematically showing the configuration of the electronic balance according to still another embodiment of the present invention.

FIG. 4 is a diagram schematically showing the configuration of the electronic balance according to still another embodiment of the present invention.

In the present embodiment, a middle beam 46 is added between the first beam and the second beam in series with the structure shown in FIG. 2 being a base.

That is to say, an electronic balance 2 is provided with: a main Roberval mechanism R1 for conveying the load of an object to be scaled W in the vertical direction; a first beam 14 which is supported by the first fulcrum 15 so as to be able to sway and where the main Roberval mechanism R1 is connected to one end portion on the side close to the first fulcrum (near distance point), and at the same time, the middle beam 46 is connected to the other end portion on the side far away from the first fulcrum (far distance point) via a connection member 43; a middle beam 46 which is formed so as to be able to sway due to a middle fulcrum 47 and where the first beam 14 is connected to one end portion on the side close to the middle fulcrum 47 (near distance point) via the connection member 43 as described above and the second beam 42 is connected to the other end portion on the side far away from the middle fulcrum 47 (far distance point) via the connection member 48; a second beam 42 which is formed so as to be able to sway due to a second fulcrum 41 located in an end portion and where the middle beam 46 is connected to one point on the side close to the second fulcrum 41 (near distance point) via the connection member 48 as described above and an electromagnetic force generating apparatus 17 is connected to one point on the side far away from the second fulcrum 41 (far distance point); an electromagnetic force generating apparatus 17 for generating electromagnetic force which is balanced with the applied load; incorporated weight 18 for correction; a sub-Roberval mechanism R2 for conveying the load of the incorporated weight 18 in the vertical direction; and a linking member 44 where the sub-Roberval mechanism R2 is connected to one end portion, and at the same time, the second beam 42 is connected to the other end portion.

The main Roberval mechanism R1 conveys the load of the object to be scaled W in the vertical direction and has an upper beam 11, a lower beam 12 and a movable portion 13 for linking the upper beam 11 and the lower beam 12. Furthermore, a scale 16 on which an object to be scaled W is places is provided in the upper portion of the movable portion 13.

The first beam 14 is provided so as to be able to sway with the first fulcrum 15 at the center. In addition, the movable portion 13 of the main Roberval mechanism R1 is connected to one end portion of the first beam 14, and at the same time, the middle beam 46 is connected to the other end portion of the first beam 14 via the connection member 43. Therefore, the load of the object to be scaled W placed on the scale 16 is conveyed to the first beam 14 via the main Roberval mechanism R1, and thus, the displacement of the first beam 14 is conveyed to the middle beam 46 via the connection member 43. At this time, the ratio (a:b) of the length (a) of the first beam 14 on the movable portion 13 side to the length (b) of the first beam 14 on the connection member 43 side with the first fulcrum 15 of the first beam 14 as a reference is a lever ratio.

The middle beam 46 is provided so as to be able to sway with the middle fulcrum 47 at the center. In addition, the first beam 14 is connected to one end portion of the middle beam 46 via the connection member 43, and at the same time, the second beam 42 is connected to the other end portion of the middle beam 46 via the connection member 48. At this time, the ratio (f:g) of the length (f) of the middle beam 46 on the near distance point side to the length (g) on the far distance point side with the middle fulcrum 47 of the middle beam 46 as a reference is a lever ratio.

The second beam 42 is provided so as to be able to sway with the second fulcrum 41 located in an end portion of the pole at the center. In addition, the middle beam 46 is connected to one point on the second beam 42 (near distance point) via the connection member 48, and at the same time, the electromagnetic force generating apparatus 17 is provided at a point on the second beam 42 (far distance point). Therefore, the displacement of the first beam 14 is conveyed to the second beam 42 via the connection member 43 and the middle beam 46, and thus, the second beam 42 is displaced.

Here, the second fulcrum 41 is located in an end portion, and therefore, the middle beam 46 is connected to the second beam 42 on the same side as the electromagnetic force generating apparatus 17 side relative to the second fulcrum 41. As a result, the load of the object to be scaled W placed on the scale 16 is conveyed as the downward displacement on the electromagnetic force generating apparatus 17 side of the second fulcrum 41 of the second beam 42. That is to say, the direction in which the load of the object to be scaled W placed on the scale 16 is conveyed to the electromagnetic force generating apparatus 17 and the direction in which the load of the below described incorporated weight 18 is conveyed to the electromagnetic force generating apparatus 17 can be made the same when the load is conveyed to the electromagnetic force generating apparatus 17. Therefore, as for the electromagnetic force required to maintain the balance of the second beam 42 in the electromagnetic force generating apparatus 17, only the force in the direction toward one side needs to be taken into consideration, and therefore, the width of the intensity of the electromagnetic force can be narrowed.

Here, the ratio (c:e) of the length (c) of the second beam 42 on the connection member 43 side to the length (e) of the second beam 42 on the electromagnetic force generating apparatus 17 side with the second fulcrum 41 of the second beam 42 as a reference is a lever ration.

The sub-Roberval mechanism R2 conveys the load of the incorporated weight 18 in the vertical direction and has an upper beam 21, a lower beam 22 and a movable portion 23 for linking the upper beam 21 and the lower beam 22. Furthermore, an engaging portion 32 for carrying the incorporated weight 18 is provided in the movable portion 23. Here, at the time of conventional weighing, the incorporated weight 18 is supported by a hoisting apparatus (not shown), and thus, the load of the incorporated weight 18 is not applied to the engaging portion 32. Meanwhile, at the time of correction, the incorporated weight 18 is not supported by a hoisting apparatus (not shown), and thus, the load of the incorporated weight 18 is applied to the engaging portion 32.

The movable portion 23 of the sub-Roberval mechanism R2 is connected to one end portion of the linking member 44, and at the same time, the second beam 42 is connected to the other end portion of the linking member 44. Therefore, the load of the incorporated weight 18 is conveyed to the second beam 42 via the sub-Roberval mechanism R2. At this time, the linking member 44 is connected to the second beam 42 on the electromagnetic force generating apparatus 17 side of the second fulcrum 41. That is to say, the ratio (d:e) of the point (d) where the second beam 42 and the linking member 44 are connected to the length (e) of the second beam 42 on the electromagnetic force generating apparatus 17 side with the second fulcrum 41 of the second beam 42 as a reference is a lever ratio.

As described above, in the electronic balance 2, the linking member 44 for conveying the load of the incorporated weight 18 is connected between the second fulcrum 41 and the electromagnetic force generating apparatus 17, and therefore, the incorporated weight 18 can be provided without an extending portion, which is an extension of the first beam 14 on the movable portion 13 side, being provided. In addition, precise correction can be carried out using the incorporated weight 18 which has a load of $W \times (a/b) \times (f/g) \times (c/d)$ and is lighter than that in FIG. 2. That is to say, a reduction in the weight and in the scale of the electronic balance 1 can further be achieved.

Though in the present embodiment one middle beam 46 is provided between the first beam 14 and the second beam 42, an additional middle beam may be connected in series between the middle beam 46 and the second beam 42 so that the attenuation ratio can further be increased.

INDUSTRIAL APPLICABILITY

The electronic balance according to the present invention can be formed for use so that precise correction can be carried out by using incorporated weight, for example.

The invention claimed is:

1. An electronic balance, comprising:
a scale;
a main Roberval mechanism for conveying the load of an object to be measured which is mounted on the scale in the vertical direction;
a first beam made up of a first pole which is supported by a first fulcrum so as to be able to sway, where the main Roberval mechanism is connected to the near distance point and a connection means for conveying the load of the object to be measured is connected to the far distance point, the near distance point being a distance point close to the first fulcrum on the first pole and the far distance point being a distance point far away from the first fulcrum;
a second beam made up of a second pole which is supported by a second fulcrum so as to be able to sway, where the first beam is connected to a near distance point via a connection means and an electromagnetic force generating apparatus for generating an electromagnetic force that is balanced with the load of the object to be measured which is conveyed from the first beam is connected to a far distance point, the near distance point being a distance point close to the second fulcrum on the second pole and the far distance point being a distance point far away from the second fulcrum;
incorporated weight for correction;
a sub-Roberval mechanism for conveying the load of said incorporated weight in the vertical direction;
a linking member for conveying the load of said incorporated weight to the second beam via said sub-Roberval mechanism; and
an electromagnetic force generating apparatus for generating an electromagnetic force that is balanced with the load of the object to be measured, characterized in that
said linking member is connected to said second beam on the electromagnetic force generating apparatus side relative to the second fulcrum; and
said linking member is connected between the second fulcrum and said electromagnetic force generating apparatus.

2. The electronic balance according to claim 1, characterized in that said connection means includes at least one middle beam made up of a pole of which the two ends are connected to the first beam and the second beam via connection members in series, each middle beam is supported by a middle fulcrum in the middle beam so as to be able to sway, and a near distance point of each middle beam is connected to the connection member on the first beam side and a far distance point of each middle beam is connected to the connection member on the second beam side, the near distance point being a distance point close to the middle fulcrum of the middle beam and the far distance point being a distance point far away from the middle fulcrum.

3. The electronic balance according to claim 1, further comprising a lifting apparatus for conveying the load of said incorporated weight to said sub-Roberval mechanism when the load of said object to be measured is weighed, and at the same time, for not conveying the load of said incorporated weight to said sub-Roberval mechanism at the time of correction.

4. The electronic balance according to claim 1, characterized in that said connection means is formed of only one connection member.

5. The electronic balance according to claim 4, characterized in that
said second fulcrum is provided between the near distance point and the far distance point in said second beam, a lifting apparatus for not conveying the load of said incorporated weight to said sub-Roberval mechanism when the load of said object to be measured is weighed, and at the same time, conveying the load of said incorporated weight to said sub-Roberval mechanism at the time of correction is provided, and
the direction in which the load of the weight to be weighed mounted on said scale is conveyed to the electromagnetic force generating apparatus, and the direction in which the load of the incorporated weight is conveyed to the electromagnetic force generating apparatus at the time of correction are the same.

6. The electronic balance according to claim 4, characterized in that
said near distance point is provided between the second fulcrum and the far distance point in said second beam,
a lifting apparatus for conveying the load of said incorporated weight to said sub-Roberval mechanism when the load of said object to be measured is weighed and not conveying the load of said incorporated weight to said sub-Roberval mechanism at the time of correction is provided, and the direction in which the load of the object to be measured mounted on said scale is conveyed to the electromagnetic force generating apparatus, and the direction in which the load of the object to be weighed is conveyed to the electromagnetic force generating apparatus at the time of correction due to the load of said incorporated weight not being conveyed are the same.

* * * * *